United States Patent [19]

Vanaschen et al.

[11] Patent Number: 4,738,704

[45] Date of Patent: Apr. 19, 1988

[54] METHOD FOR BENDING LAMINATED GLASS SHEETS

[75] Inventors: Luc Vanaschen, Eupen; Herbert Radermacher, Raeren/Belgien, both of Belgium; Hans W. Kuster, Aachen; Norbert Schwarzenberg, Herzogenrath, both of Fed. Rep. of Germany

[73] Assignee: Saint-Gobain Vitrage, Paris, France

[21] Appl. No.: 46,121

[22] Filed: May 5, 1987

[30] Foreign Application Priority Data

May 6, 1986 [DE] Fed. Rep. of Germany ....... 3615225

[51] Int. Cl.⁴ .............................. C03B 23/02
[52] U.S. Cl. ....................... 65/106; 65/104; 65/107; 65/273; 65/287
[58] Field of Search .............. 65/104, 106, 107, 273, 65/287

[56] References Cited

U.S. PATENT DOCUMENTS

| | | | |
|---|---|---|---|
| 4,204,854 | 5/1980 | McMaster et al. | 65/287 X |
| 4,268,297 | 5/1981 | Gorner | 65/104 |
| 4,368,065 | 1/1983 | Frank | 65/273 |
| 4,386,952 | 6/1983 | Nitschke | 65/273 |
| 4,682,997 | 7/1987 | Halberschmidt | 65/273 X |

Primary Examiner—Arthur Kellogg
Attorney, Agent, or Firm—Oblon, Fisher, Spivak, McClelland & Maier

[57] ABSTRACT

The invention relates to a method for the manufacture of a curved double sheet of glass intended for further processing into a sheet of curved laminated safety glass. In a horizontal position the glass sheets are heated successively to bending temperature in a roller oven and are successively bent in a bending station subsequent to the roller oven, in that the sheets are pressed against a bending mold (2) arranged above the transport rollers (1) by a hot gas stream directed against the glass sheets from beneath. After bending, the first glass sheet (10) of a pair of glass sheets is held in a waiting position in such a manner that its shape is supported. After the bending of the second individual glass sheet (10'), the two glass sheets (10, 10') are stacked and cooled together.

6 Claims, 3 Drawing Sheets

METHOD FOR BENDING LAMINATED GLASS SHEETS

BACKGROUND OF THE INVENTION

1. Field of the Invention

The invention relates to the manufacture of curved laminated glass sheets having two or more single glass sheets bonded together with adhesive plastic layers. It particularly relates to a method for bending the silicate glass sheets intended to become curved laminated glass sheets, in which the glass sheets are individually heated to bending temperature in a passthrough oven, and are individually bent with the aid of a full-surface bending mold.

2. Discussion of the Background

The most well-known method for bending glass sheets intended to become laminated glass sheets, for example windshields for motor vehicles, consists of stacking the associated glass sheets, i.e. the two single glass sheets in a common glass laminate, on a peripheral bending mold and passing them together through a heating oven, where, under the effect of their own weight they come to rest against the peripheral bending mold when they attain the bending temperature. The disadvantages of this method are, first, that it is not possible to produce complicated sheet shapes in this manner, and second, that all glass sheets bent in this manner also have, to a greater or lesser degree, a spherical bending, i.e. are curved in both surface directions.

In order to avoid these disadvantages, it is also already known to bend the glass sheets intended for the manufacture of laminated glass sheets into the desired shape with the aid of a bending press. In one of these known press bending methods the two glass sheets are brought together between the two bending molds of the bending press and are bent jointly (DE-AS 11 92 373). According to another known press bending method the glass sheets are hung individually on supports between the bending molds of a bending press, and are bent and cooled individually (DE-OS 19 29 115).

These known press bending methods for multiple glass sheets are also associated with substantial disadvantages. When the sheets are together as they are being bent by two mechanical press tools, of which generally the convex bending tool consists of a full-surface bending mold, and the concave bending tool consists of a frame bending mold, the two glass sheets are cooled differently on their surfaces that contact the bending mold, so that the stacked glass sheets separate from each other along the edges. This incongruent deformation of the two glass sheets cannot be completely reversed. In another known method, namely the press bending of the individual glass sheets while they are suspended, it is also not possible to attain a fully congruent form of the two single glass sheets, because even the smallest difference in the cooling conditions after the pressing step will lead to deformations which make the glass sheets unusable for further processing into laminated glass.

SUMMARY OF THE INVENTION

The object of the invention is to create a press bending method for glass sheets which is able to bend the associated glass sheets with great precision and to create fully congruent sheet shapes, so that their further processing into laminated glass sheets is possible with a high rate of production.

Beginning from a method in which the glass sheets are individually heated to bending temperature and individually bent, the object of the invention is achieved in that the heating to bending temperature takes place with the glass sheets in a horizontal position in the passthrough oven, the individual glass sheets in the bending station following the heating oven are lifted from the transport track and pressed against a bending mold arranged above the transport track by a hot gas stream directed against the glass sheets from beneath, the first single glass sheet remains in a waiting position at bending temperature after the press molding step in such a manner that its shape is supported, and after the press molding of the second single glass sheet the two single glass sheets are stacked at bending temperature on a support ring corresponding to the peripheral shape and are cooled together.

This invention is based on the attainability of identical bending conditions for the two single glass sheets during the press molding thereof, and also takes advantage of the fact that a press molding method, in which the glass sheet is pressed against a bending mold not by a rigid counter mold but with the aid of a hot air flow, is also particularly advantageous for the manufacture of bent pairs of glass sheets for laminated glass. Accordingly, particular significance is also given to the step that after the press molding of the two single glass sheets, the two glass sheets are immediately stacked at bending temperature and slowly cooled together, whereby, however, still-present small mutual deviations in shape smooth out and fully congruent glass sheets are attained.

After the press molding step for the first single glass sheet, said sheet remains in a waiting position at bending temperature in such a manner that its shape is supported. According to a first embodiment of the method according to the invention, this is realized in such a manner that the first single glass sheet is placed on the support ring after the bending step, the support ring with the bent single glass sheet is brought into a waiting station adjacent the bending station and after the bending of the second single glass sheet, the first is brought back into the bending station beneath the bending mold and the second single glass sheet, which is still in contact with the bending mold is placed onto the first single glass sheet.

It should be understood that one is not limited hereby to the manufacture of a pair of glass sheets consisting of only two single glass sheets. A third bent single glass sheet can also be placed on two already stacked glass sheets, or even more than three single glass sheets can be stacked and cooled together. This can be desirable, for example, if laminated glass sheets are to be manufactured from three or more single glass sheets, or if it is desired to cool two pairs of glass sheets on a common support ring for the manufacture of two laminated glass sheets.

According to a second embodiment of the method according to the invention the method step of holding the first bent single glass sheet in a waiting position is realized in that the first single glass sheet is held in contact with the molding surface of the bending mold after the bending process, the bending of the second single glass sheet takes place by its being pressed against the first bent single glass sheet held in contact with the bending mold, and the two single glass sheets thus pressed together are placed together on the support ring.

Advantageously, the first bent single glass sheet is held in contact with the bending mold in that the bending mold is provided with suction openings and is connected with a negative pressure pump, so that the glass sheet remains in this position through the effects of suction. The same result can also be achieved by means of excess gas pressure acting on the underside of the glass sheet, whereby the hot gas flow holding the glass sheet in this position must be directed in such a manner that the path of the second glass sheet entering the bending station is not disturbed thereby before it reaches its end position beneath the first glass sheet.

Further details and advantages of the invention are characteristics of the dependent claims and are shown from the following description of two exemplary embodiments for the method according to the invention with the aid of the drawings.

DETAILED DESCRIPTION OF THE INVENTION

Figure 1:
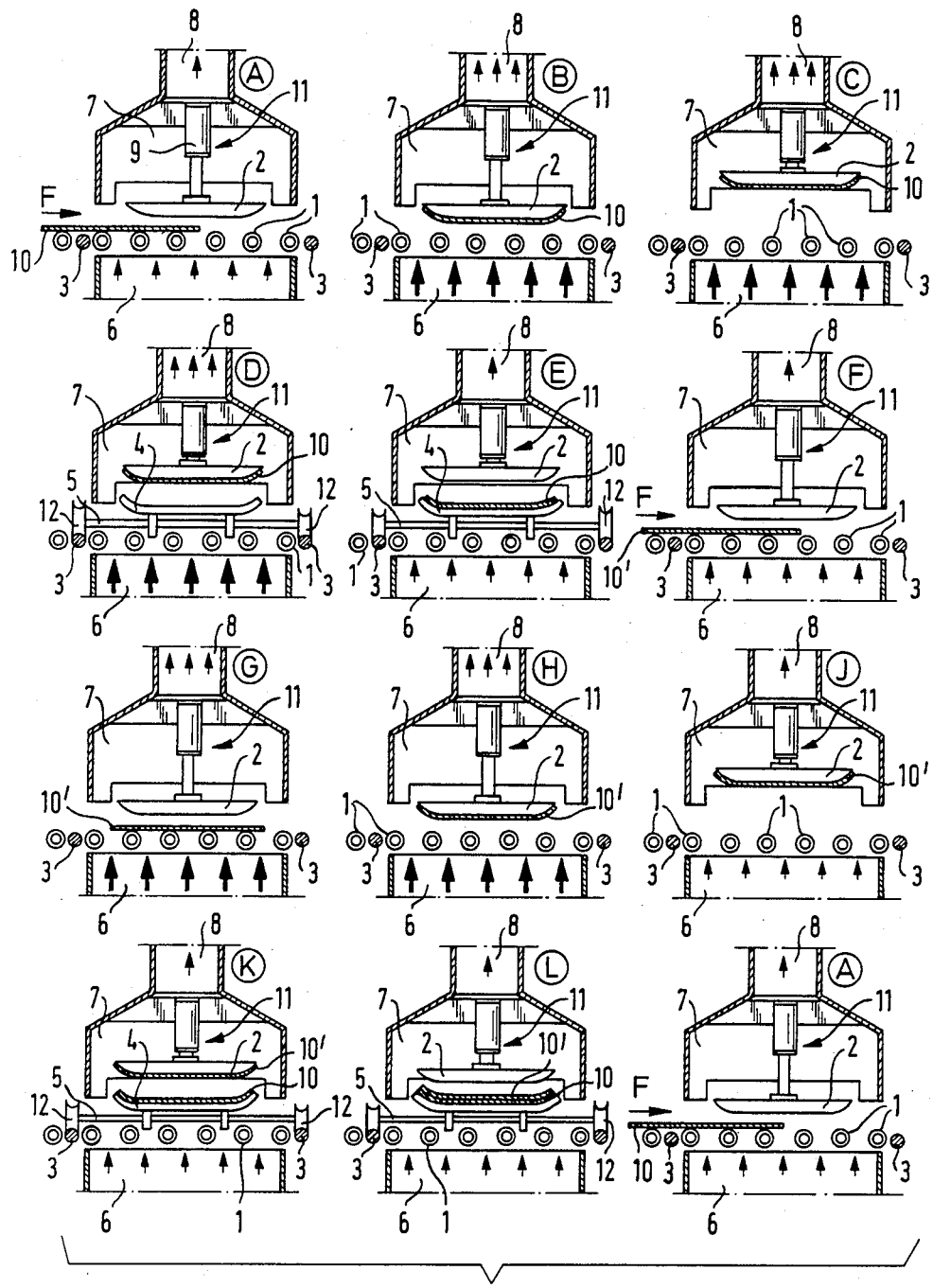
FIG. 1 A schematic illustration of the method steps of a first embodiment of the method according to the invention.

FIG. 1 shows the successive method steps of the first embodiment of the new method in the form of a vertical section through the bending station.

As material components, the bending station has a horizontal roller conveyor 1, a full-surface bending mold 2 arranged in the center of the bending station above the roller conveyor 1, rails 3 arranged laterally to the transport direction of the roller conveyor 1, on which rails 3 a cart 5 can travel supporting a support ring 4 corresponding to the shape of the bent glass sheet, a vertical flow channel 6 arranged beneath the roller conveyor 1 in which a hot gas flow, particularly a hot air flow, can be directed upward vertically between the transport rollers of the roller conveyor 1, as well as a hood 7 closing off the upper portion of the bending station, through which hood 7 the hot gas is removed through the tube line 8 and recirculated back to the flow channel 6. The temperature, volume of flow and pressure of the hot gas flow can be regulated within the requisite limits. In particular, the pressure and volume of flow are adjustable, for example with the aid of a throttle valve, from a low value to a high value, and vice versa.

With a glass sheet 10 to be bent having a thickness of e.g., 3 mm, the high value of pressure can be, for example, about 40 mm of water column. This value is sufficient to lift the glass sheet from the roller conveyor 1 and press it against the bending mold 2, where the glass sheet rests against the bending mold 2 under the effect of the gas pressure and assumes its shape. The lower value of the gas pressure can be, for example, about 8 mm of water column. This value is sustained as the glass sheet 10 enters the bending station on the roller conveyor 1, as the glass sheet 10 is placed onto the support ring 4 from the bending mold, and as the bent glass sheet 10 rests on the support ring 4.

The means for producing a hot air flow such as is necessary for the performance of the method according to the invention are described in detail in DE-OS 35 23 675.

The glass sheet 10 is heated to bending temperature in a heating oven (not shown) provided with horizontal conveyor roller or another support and transport system for the horizontally disposed glass sheets, and with the aid of the driven conveyor rollers 10 said glass sheet 10 is transported into the bending station (position A) in the direction of the arrow F. During this transport process the hot air flow produces a pressure of about 8 mm of water column, which acts against the bottom of the glass sheet 10 and compensates for a portion of the inherent weight thereof. In this manner deformations of the glass sheet are prevented which can arise from the suspension of the glass sheet portions between the conveyor rollers due to the inherent weight of the glass sheet. On the other hand, the portion of the weight of the glass sheet supported by the conveyor rollers 1 is sufficient to provide sufficient adhesive friction to reliably transport the glass sheet. The bending mold 2, which is attached to a suitable holding device 11, is lowered into a lower position, i.e. just at a relatively small distance from the glass sheet 10. The glass sheet 10 is positioned within the bending chamber in a position where it lies precisely beneath the bending mold 2.

Immediately after this positioning beneath the bending mold 2, the pressure of the hot air flow is increased to about 40 mm of water column. In this manner the glass sheet 10 is lifted from the conveyor rollers and pressed against the bending mold 2 with a uniform mild pressure. This method step is illustrated in position B.

The bending mold 2 together with the glass sheet 10 is then raised (position C) until a transport cart 5 with the support ring 4 can be brought into the bending station beneath the glass sheet on the rails 3 (position D). The transport cart 5, the wheels 12 of which run on the rails 3, is positioned in the bending station in such a manner that the support ring 4 is located precisely beneath the glass sheet.

Next, the glass sheet 10, which until this point has been held in contact with the bending mold 2 by the high gas pressure of about 40 mm of water column, is placed on the support ring 4 (position E). In order to place the glass sheet 10 on the support ring 4, the pressure of the hot gas flow is reduced to about 8 mm of water column, whereby the glass sheet 10 does not fall suddenly onto the support ring 4, but rather comes slowly to rest on the support ring 4. It is also possible thereby, if desired, to lower the bending mold 2 to some degree. As soon as the glass sheet 10 rests on the support ring 4, the transport cart 5 is brought out of the bending station into a waiting position immediately adjacent the bending station. In this waiting position (not shown here) the glass sheet can also be supported by an increasing hot air flow, in order to avoid additional sagging of the glass sheet under the effect of its own weight. The temperature in this waiting position should be held at a value just below the bending temperature.

When the cart 5 with the glass sheet 10 is located in the waiting position (position F), the gas pressure in the bending chamber remains at its lower value' and the second glass sheet 10' then travels into the bending station. As the glass sheet travels into the bending station, the bending mold 2 is brought back into a lower position just above the glass sheet 10′.

In position G the glass sheet 10′ has reached its precise end position, and at this moment the gas pressure is increased to its high value of about 40 mm of water column. As a result of this pressure increase, the glass sheet 10′ is lifted from the conveyor rollers and pressed against the full-surface bending mold 2 (position H).

The underside of the bending mold 2 is provided with suction openings which are connected with a negative pressure pump. The gas pressure in the flow channel 6 is then lowered back to a lower value of about 8 mm of water column, and the glass sheet 10′ is then held against the bending mold 2 by suction (position J).

During this same time, the transport cart 5 with the first bent glass sheet 10 lying on the support ring 4 is moved from its waiting position back into the bending station. At the moment illustrated in position K, the glass sheet 10 has attained its end position precisely beneath the glass sheet 10′.

The bending mold 2 with the glass sheet 10′ is then lowered. Once the glass sheet 10′ has reached a position just above the glass sheet 10, the negative pressure in the bending mold 2 and its resultant suction are cut off and the glass sheet 10′ accordingly is placed onto the glass sheet 10 (position L). If desired, the height at which the glass sheet 10′ is released from the bending mold 2 can be selected such that the glass sheet 10′ falls with a greater or lesser amount of kinetic energy onto the glass sheet 10, whereby the proper placement of this upper glass sheet 10′ onto the lower glass sheet 10 can be facilitated.

The transport cart 5 with the pair of glass sheets 10, 10′ is then brought into a cooling oven on the rails 3, where the glass sheet pair is slowly cooled in a known manner. During this same time the next glass sheet 10 travels into the bending station, and the next bending cycle begins again with the position A.

Figure 2:
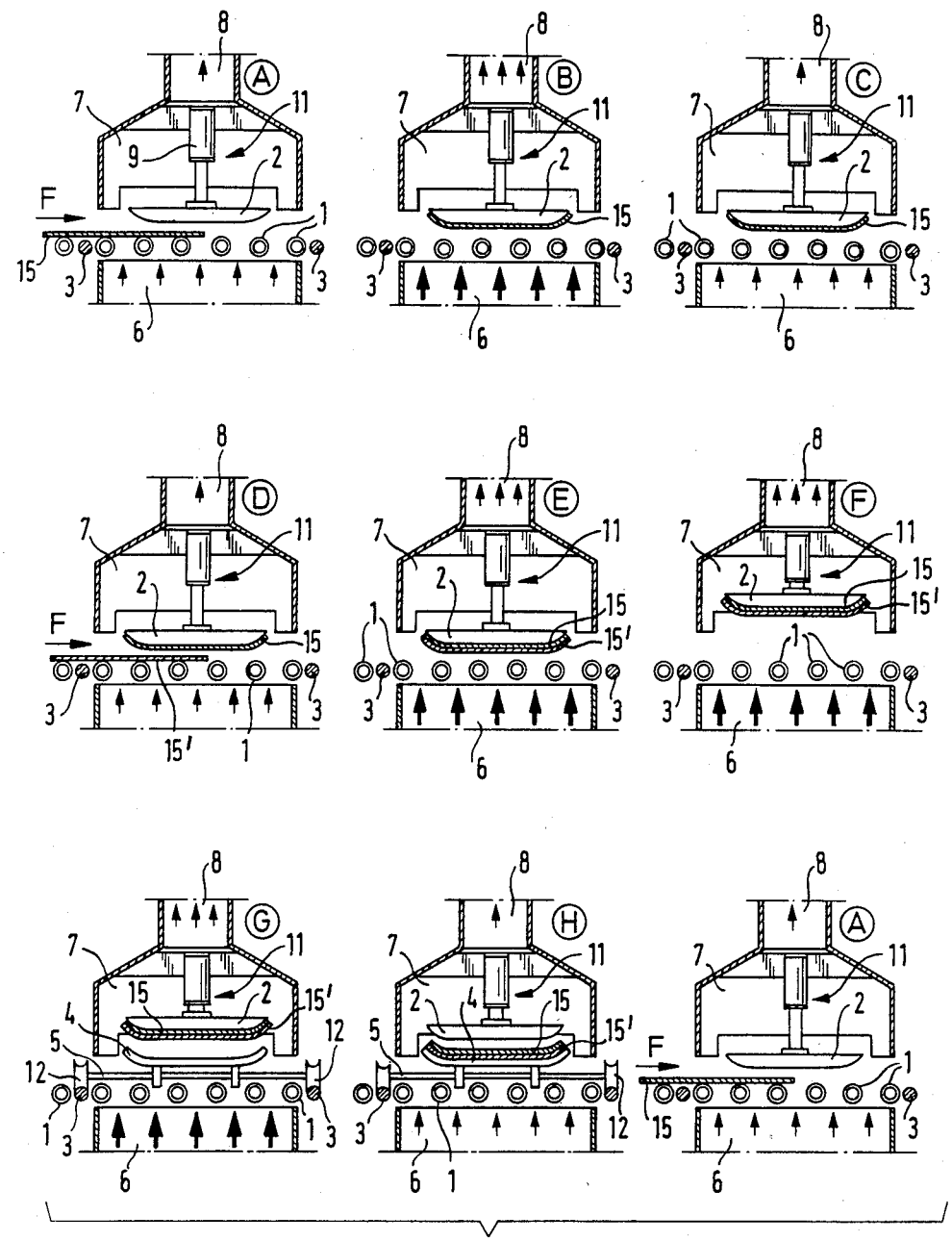
FIG. 2 A schematic illustration of the method steps of a second embodiment of the method according to the invention, and FIG. 3 An apparatus suitable to perform the method according to the invention.

In the exemplary embodiment of the new method as illustrated in FIG. 2, the same apparatus is used as that used in the method described in connection with FIG. 1, whereby the bending mold 2 has a shaping surface provided with suction openings, and these suction openings are connected with a negative pressure pump. The embodiment of the bending mold 2 is known, and for purposes of simplification the necessary devices for the production of the suction effect are not illustrated in the drawings.

The method cycle begins with the position A, where the glass sheet 15 travels into the bending station on the driven transport rollers 1. With the aid of suitable known means, the glass sheet 15 is positioned beneath the bending mold 2. During this transport and positioning process, the gas pressure in the flow channel 6 is held at a value of about 8 mm of water column, which leads to a lessening of weight and prevents a sagging of the glass sheet between the transport rollers.

As soon as the glass sheet 15 has reached its end position in the bending station, the pressure of the hot gas in the flow channel 6, which gas has a temperature of about 650 degrees C., is suddenly increased to about 40 mm of water column (position B). In this manner the glass sheet 15 is lifted from the transport rollers 1 and pressed against the bending mold 2, where it assumes the shape determined by the bending mold.

The bending mold 2, either just previously or at this moment, is connected to the negative pressure pump, so that the glass sheet 15 is held against the bending mold 2 by the suction effect. The gas pressure in the flow channel 6 is then reduced back to the lower value of about 8 mm of water column. This condition corresponds to the position C in FIG. 2.

While the glass sheet 15 is held in this waiting position against the bending mold 2, the second glass sheet 15′ of the glass sheet pair travels into the bending station (position D). The pressure of the hot gas flow in the flow channel 6 during this period is held at the lower value of about 8 mm of water column, and the glass sheet 15′ is positioned precisely in the end position beneath the bending mold.

In the next method step (position E) the pressure of the hot gas is suddenly raised back to about 40 mm of water column. Under the effect of this pressure, the glass sheet 15′ is lifted from the transport rollers 1 and pressed against the underside of the glass sheet 15 located itself against the bending mold 2, and conforms to this glass sheet 15 over its entire area.

The pressure of the hot gas flow is held at the high value in the next method step, illustrated in position F, so that the glass sheet 15′ remains in contact with the glass sheet 15, and the bending mold 2, together with the two glass sheets 15 and 15′ is moved into an upper position. A transport cart 5 with a support ring 4 corresponding to the shape of the sheet travels into the bending station and is positioned there in such a manner that the support ring lies precisely beneath the edge of the glass sheets 15, 15′ (position G). During this method step the high pressure of the hot gas flow is maintained.

As soon as the support ring 4 has reached its final position, the bending mold 2 with the pair of glass sheets 15, 15′ is lowered to a position just above the support ring 4. The negative pressure in the bending mold 2 is then cut off and the gas pressure in the flow channel 6 is reduced to the lower value (position H). The reduction of the gas pressure causes the pair of glass sheets 15, 15′ to be lowered gently onto the support ring 4. After the bending mold 2 has again been raised, if necessary, the transport cart 5 then travels with the pair of glass sheets 15, 15′ out of the bending station into the subsequent cooling oven.

The bending cycle is thus ended. The bending mold 2 is brought back into its lower position, and the bending station is ready to receive the next glass sheet 15, so that the position A of the next bending cycle then follows.

Figure 3:
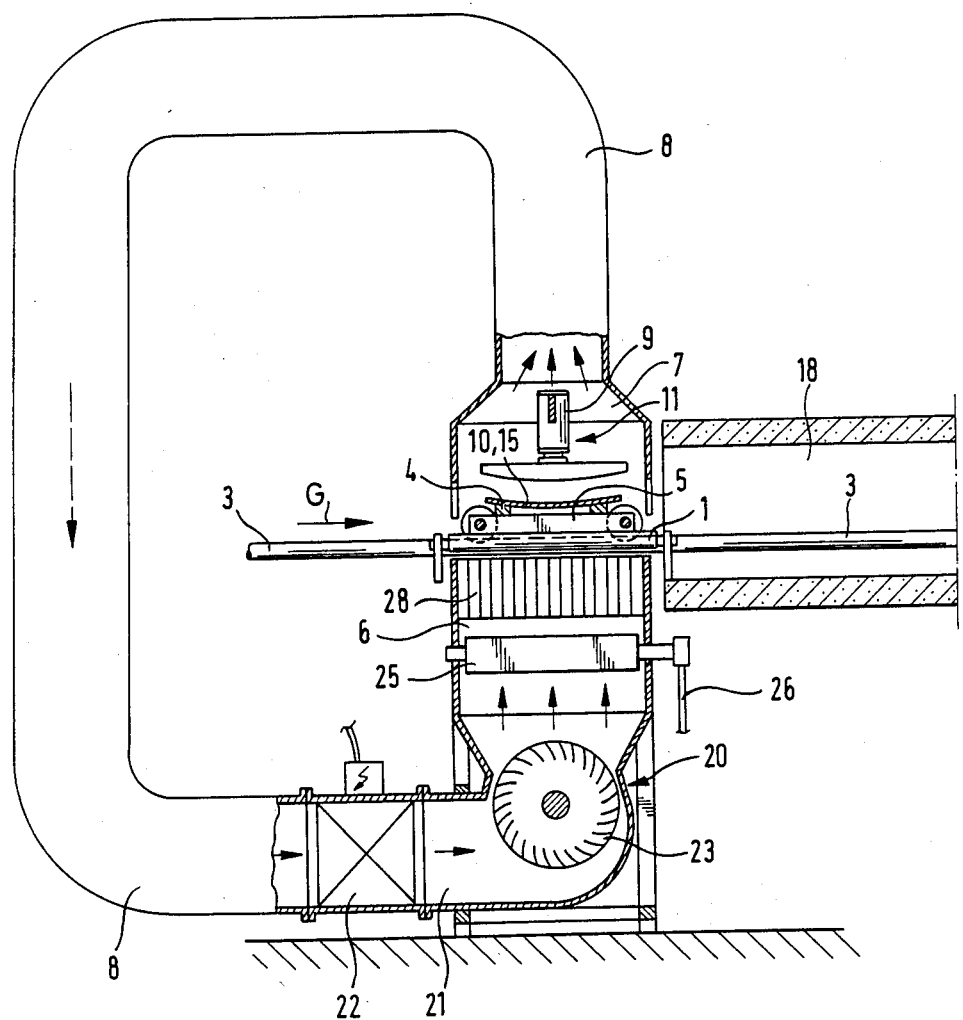

The entire system necessary for the performance of the method according to the invention is illustrated in FIG. 3. The material portion of the system is the bending station with the raisable and lowerable bending mold 2, which is arranged so as to be adjustable vertically with the aid of a device schematically illustrated here as a pneumatic cylinder 9. The transport rollers 1 form the conveyor system on which the glass sheets are passed through a channel-like oven (not shown), are heated therein to bending temperature and are then transported into the bending station.

Rails 3 are arranged laterally to the transport device of the conveyor system formed by the transport rollers 1 within the bending station, which rails lead on one side into a cooling oven 18 in which the bent glass sheets are slowly cooled. The empty transport cart 5 travel on these rails 3 into the bending station from one side in the direction of the arrow G. After passing through the cooling oven 18 the transport carts 5 are guided back to the bending station in a circulating manner.

The bending mold 2 is formed as a suction mold in a known manner and can be connected to a negative pressure pump in such a manner that it can securely hold the glass sheet against the molding surface. For purposes of simplicity, the necessary means therefor are not illustrated.

The vertically arranged flow channel 6, through which the hot air flow is directed against the glass sheets from beneath, is arranged beneath the bending mold. The hot air flow is captured above the bending mold by the hood 7 and recirculated through the tube connection 8. To produce the necessary volume of flow . . . and the required pressure a cross current ventilator 20 is employed. In front of the suction channel 21—with a rectangular cross section—of the cross current ventilator, an electric damper register 22 is mounted, by means of which the circulating air stream is heated to the temperrature of between 550° and 600° C. needed for the process.

Above the running wheel 23 of the cross current ventilator the adjustable butterfly valves 25 are arranged in the flow channel 6. With the aid of these butterfly valves the volume stream and thus the effective pressure of the hot air stream is adjusted from an adjustable low value to an adjustable high value. The switching from the low pressure to the high pressure and reverse is done by means of the lever 26 which is operated by a suitable control. Above the butterfly valves 25, vertically aligned rectifier panels 26 are arranged which provide for a homogenization of the air stream.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the united states is:

1. Method for bending glass sheets intended for the manufacture of laminated safety glass, comprising individually heating the glass sheets to bending temperature in a pass-through oven in horizontal position, and individually bending said sheets with the aid of a full-surface press bending mold, wherein the individual glass sheets, in the bending station following the pass-through oven, are sequentially raised from a transport track by a hot gas stream directed against the glass sheets from beneath and are pressed against the bending mold arranged above the transport track, after the press molding step, the first individual glass sheet of a pair of glass sheets is held in a shape-supporting manner at about bending temperature in a waiting position, and after the press molding of the second individual glass sheet, the two individual glass sheets are stacked at bending temperature on a support ring corresponding to the peripheral shape, and are cooled together.

2. Method according to claim 1, wherein the first individual glass sheet is placed on a support ring after the bending step, the support ring with the curved single glass sheet is brought into a waiting position adjacent the bending station, after the bending of the next single glass sheet the support ring with the first bent single glass sheet is returned into the bending station beneath the bending mold, and the second single glass sheet contacting the bending mold is placed onto the previously bent single glass sheet.

3. Method according to claim 2, wherein the placement of the bent single glass sheets onto the support ring and on the previously bent glass sheet is assisted by lowering the bending mold.

4. Method according to claim 2, wherein a laminated glass sheet having more than two individual glass sheets is prepared, the support ring with at least two individual glass sheets is brought into a waiting position after bending, and from there is returned into the bending chamber for placement of the next bent glass sheet thereon.

5. Method according to claim 1, wherein after the bending step, the first single glass sheet is held in contact with the mold surface of the bending mold by suction, the bending of the second single glass sheet is accomplished by pressing it against the single glass sheet that was bent first and held in contact with the bending mold, and in that the two glass sheets thus pressed together are deposited together onto the support ring.

6. Method according to claim 1, wherein after the glass sheets are deposited on the support ring, the flow volume and pressure of the hot gas stream are held at a value at which a portion of the actual weight of the glass sheets is supported by the gas pressure.

* * * * *